Sept. 1, 1931.  C. E. MUSSLEWHITE  1,821,395
VEHICLE
Filed April 29, 1929  2 Sheets-Sheet 1
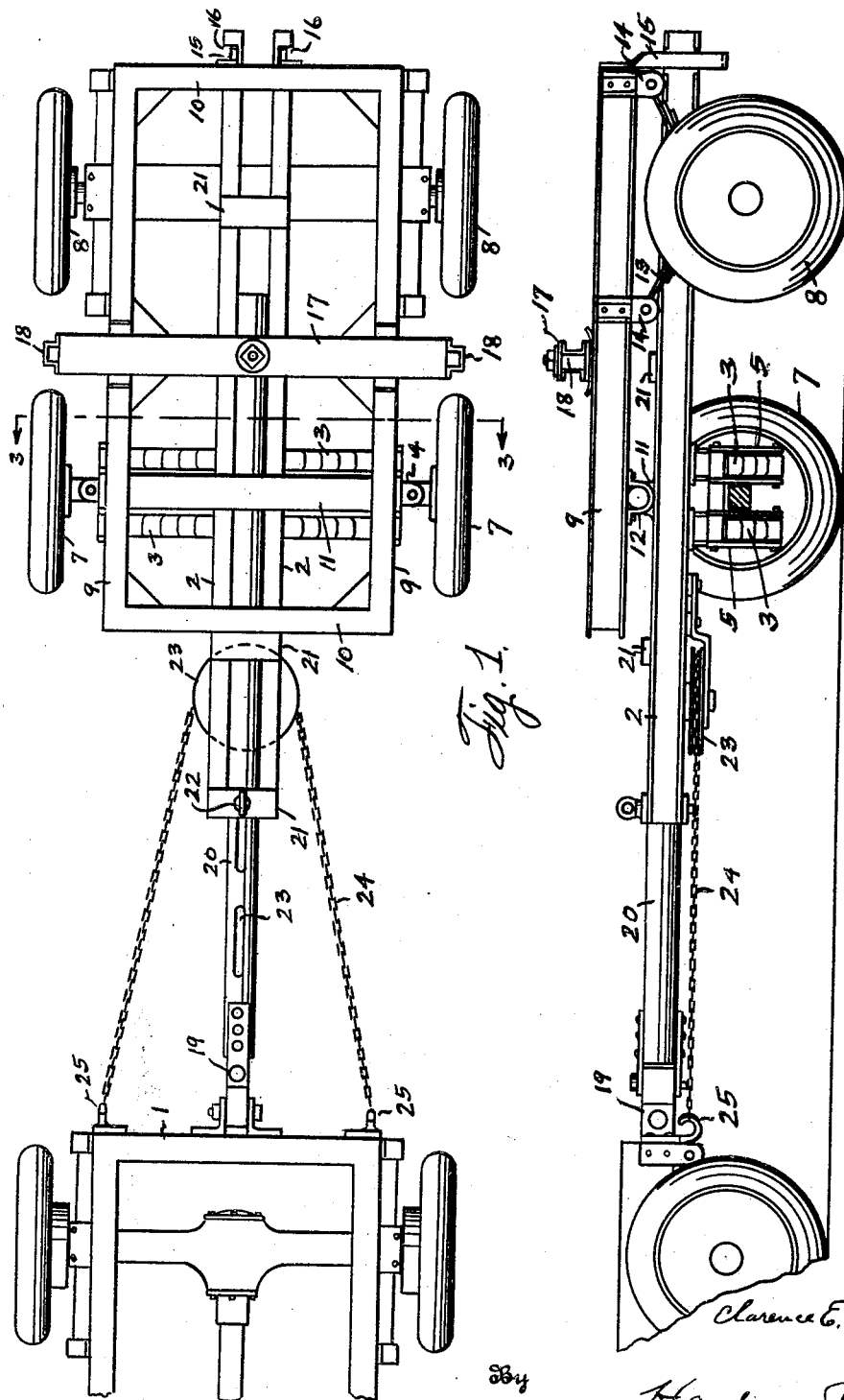

Patented Sept. 1, 1931

1,821,395

UNITED STATES PATENT OFFICE

CLARENCE E. MUSSLEWHITE, OF HOUSTON, TEXAS

VEHICLE

Application filed April 29, 1929. Serial No. 359,011.

This invention relates to new and useful improvements in a vehicle.

One object of the invention is to provide, in a vehicle adapted to carry long loads, a novel type of trailer forming part of said vehicle and novel means for connecting the trailer to the tractor, or truck, in front.

Another object of the invention is to provide a trailer having a supplemental frame mounted in a novel manner on the front axle of the trailer, and a tiltable main frame mounted on the supplemental frame with its front end pivoted to said supplemental frame on a transverse, horizontal axis and with its rear end supported on the rear axle independently of said supplemental frame.

With the above and other objects in view the invention has particular relation to certain novel features of construction, operation and arrangement of parts, an example of which is given in this specification and illustrated in the accompanying drawings, wherein:—

Figure 3:
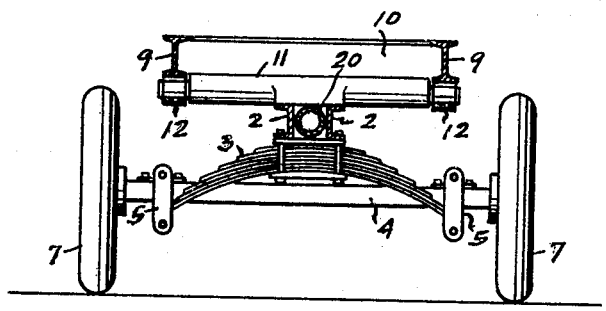
Figure 4:
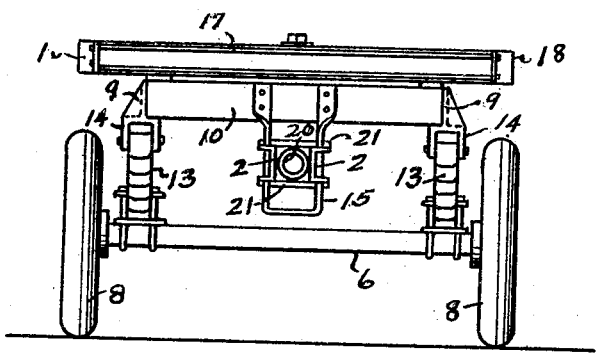
Figure 5:
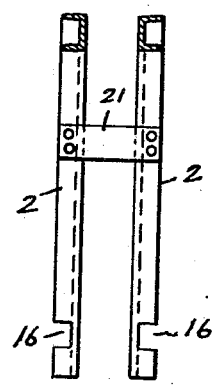

Figure 1 shows a plan view of the vehicle.
Figure 2 shows a side elevation thereof.
Figure 3 shows a transverse sectional view taken on the line 3—3 of Figure 1.
Figure 4 shows the rear elevation of the trailer and
Figure 5 shows a fragmentary plan view of the supplemental frame of the trailer.

Referring now more particularly to the drawings wherein like numerals of reference designate similar parts in each of the figures, the numeral 1 designates a truck as a whole. There is a supplemental trailer frame having the side members 2, 2 preferably formed of channel irons and spaced apart. This supplemental frame is secured on the transversely arranged leaf springs 3, 3 one in front and the other in the rear of the front axle. Front spring shackles 5, 5 are mounted on and depend from the respective ends of the axle 4 and support the ends of the leaf springs 3 beneath said front axle, said springs being thus suspended from said axle. The rear end of the main frame which is arranged above the rear axle 6 and is unsupported by said rear axle. These respective axles are carried by the front and rear wheels 7, 7, and 8, 8, respectively.

There is a main frame including the side members 9, 9 and the end members 10, 10, said main frame being mounted on said supplemental frame. There is a transverse yoke 11, disposed between the leaf springs 3, 3 and mounted on the supplemental frame and secured to the respective side members 9 underneath are the bearings 12, 12 provided to receive the respective ends of the yoke 11. Leaf springs 13, 13 are secured on the axle 6 and are spaced apart and the front and rear ends of these springs 13 are connected to the respective shackles 14, 14 one on each side, said shackles being secured to and depending from corresponding side members 9.

Fastened to the rear end member 10, and depending therefrom, there is a U-shaped stirrup 15, whose side arms work in the vertically aligned notches 16 in the flanges at the rear ends of the supplemental frame members 2.

There is a transverse bowlster 17 mounted on the main frame to pivot about a central vertical axis and the ends of this bowlster have the brackets 18, 18 to receive side standards for the usual purpose.

There is a link 19 whose forward end is pivoted to the rear end of the trailer 1 to work on a horizontal axis and whose rear end is pivoted to the forward end of the coupling member 20 to pivot on a vertical axis. The rear end of this coupling member fits between the side members 2, 2 of the supplemental frame, said side members being spaced apart the required distance to receive said coupling member snugly between them, and said side member 2 being held in said spaced relation by the cross braces 21, 21 secured to them. Said coupling member is held between said side members 2, by means of a pin 22, which is fitted through vertically aligned bearings in the forward braces 21, and in said coupling member. There are a number of such bearings as 23, in said coupling member spaced apart to provide for the adjustment of the trailer relative to the truck. Underneath the forward end of the supplemental frame and mounted to rotate on a vertical axis there is a sheave 23 and a draft chain 24 works around said sheave and has its respective ends attached to the hooks 25, 25, carried by the rear end of the tractor frame. This chain may be adjusted as the tractor and trailer are relatively adjusted.

As stated this vehicle is designed particularly for hauling long loads such as pipe and the like. The load to be hauled is loaded onto the vehicle with one end on the bowlster 17 and the other end on similar pivotally mounted bowlster on the tractor 1.

In going over rough roads the rear axle of the trailer may move up and down without transmitting the corresponding movement to the supplemental frame the rear end of the main frame moving with the rear axle and pivoting about the yoke 11. The tractor framework will thus have a greater flexibility in accommodating itself to the various movements of the front and rear axles as the vehicle moves over rough roads.

The spring shackles 5, 5 are pivoted so as to swing laterally, thus permitting sufficient side movement to the supplemental frame and the front end of the main frame to permit the trailer to track the tractor in going around curves.

The stirrup 15 confines the rear end of the supplemental frame against lateral movement and thus maintains the front and rear wheels 7 and 8 in alignment and prevents the lateral swaying, or swinging, of the trailer.

A preferred form of the invention has been shown and described by way of illustration while the principle of the invention will be defined by the appended claims.

What I claim is:

1. In a vehicle, a trailer having front and rear axles, a supplemental frame on the front axle, a main frame whose forward end is pivoted to the supplemental frame to work on a horizontal axis only and whose rear end is supported on the rear axle, and a stirrup attached to the rear end of the main frame and disposed around the supplemental frame and confining said supplemental frame to vertical movement relative to the main frame.

2. In a vehicle, a trailer having a front and a rear axle, leaf springs whose ends are swung from the front axle said springs thus having limited longitudinal movement relative to said front axle, a supplemental frame mounted on said springs, a main frame whose front end is mounted to pivot on the supplemental frame in substantially a horizontal axis only and whose rear end is mounted on the rear axle and means for limiting the rear end of the supplemental frame to substantially a vertical movement relative to the rear end of the main frame.

3. A trailer including a front axle, a rear axle, ground wheels supporting said axles, a main frame whose rear end is yieldingly supported on the rear axle and whose forward end is yieldingly mounted on the front axle to pivot on a transverse, substantially horizontal, axis, a rearwardly extending rigid member anchored with respect to the front axle and whose rear end is movable vertically relative to the rear end of the main frame, a stirrup depending from the main frame and through which said rigid member works, said stirrup and member confining said rear ends to substantially a vertical movement relative to each other.

4. A trailer including a front axle, a rear axle, ground wheels supporting said axles, a main frame whose rear end is yieldingly supported on the rear axle and whose forward end is yieldingly mounted on the front axle to pivot on a transverse, substantially horizontal, axis, a rearwardly extending rigid member anchored with respect to the front axle and whose rear end is movable vertically relative to the rear end of the main frame, means for confining said rear ends to substantially a vertical movement relative to each other, said rigid member being also extended forwardly and forming means for connecting the trailer to a tractor.

5. A trailer including a front axle, a rear axle, ground wheels supporting said axles, a main frame whose rear end is yieldingly supported on the rear axle and whose forward end is yieldingly mounted on the front axle to pivot on a transverse, substantially horizontal, axis, a rearwardly extending rigid member anchored with respect to the front axle and whose rear end is movable vertically relative to the rear end of the main frame, means for confining said rear ends to substantially a vertical movement relative to each other, said rigid member having a forward extension, adjustable relative thereto, and forming a coupling pole.

6. A trailer including a front axle, a rear axle, ground wheels supporting said axles, a main frame whose rear end is yieldably supported on the rear axle and whose forward end is yieldingly mounted on the front axle, said main frame being mounted to pivot on a transverse substantially horizontal axis, a rearwardly extending rigid member anchored with respect to the front axle and one end of which is movable vertically relative to the corresponding end of the main frame, means for confining said relatively vertically movable ends to approximately a vertical movement relative to each other, said rigid member extending forwardly forming means for connecting the trailer to a tractor.

In testimony whereof I have signed my name to this specification.

CLARENCE E. MUSSLEWHITE.